United States Patent
Yin et al.

(10) Patent No.: US 10,212,255 B2
(45) Date of Patent: Feb. 19, 2019

(54) PROCESSING REQUESTS FOR MULTI-VERSIONED SERVICE

(71) Applicant: Microsoft Technology Licensing, LLC, Redmond, WA (US)

(72) Inventors: Zhicheng Yin, Bellevue, WA (US); Xiaoyu Chen, Beijing (CN); Tao Guan, Redmond, WA (US); Paul Michael Brett, Kirkland, WA (US); Nan Zhang, Sammamish, WA (US); Jaliya N. Ekanayake, Redmond, WA (US); Eric Boutin, Renton, WA (US); Anna Korsun, Bellevue, WA (US); Jingren Zhou, Bellevue, WA (US); Haibo Lin, Issaquah, WA (US); Pavel N. Iakovenko, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 15/197,592

(22) Filed: Jun. 29, 2016

(65) Prior Publication Data

US 2017/0090958 A1 Mar. 30, 2017

Related U.S. Application Data

(60) Provisional application No. 62/233,992, filed on Sep. 28, 2015.

(51) Int. Cl.
*G06F 9/455* (2018.01)
*H04L 29/08* (2006.01)
(Continued)

(52) U.S. Cl.
CPC ........ *H04L 67/327* (2013.01); *G06F 9/44521* (2013.01); *G06F 9/5083* (2013.01);
(Continued)

(58) Field of Classification Search
CPC ... G06F 9/5083; G06F 9/44521; H04L 67/02; H04L 67/1097; H04L 67/16; H04L 67/327

See application file for complete search history.

(56) References Cited

U.S. PATENT DOCUMENTS 6,460,059 B1 * 10/2002 Wisniewski .......... G06F 17/246
715/205
6,785,706 B1 8/2004 Horman
(Continued)

OTHER PUBLICATIONS

"Hortonworks Data Platform", Published on: Jul. 21, 2015 Available at: http://docs.hortonworks.com/HDPDocuments/HDP2/HDP-2.3.0/bk_yarn_resource_mgt/bk_yarn_resource_mgt-20150721.pdf.
(Continued)

*Primary Examiner* — Van H Nguyen
(74) *Attorney, Agent, or Firm* — Workman Nydegger

(57) ABSTRACT

Processing a job request for multiple versions of a distributed computing service. The service processing node does this by at least interleavingly (e.g., via time sharing with rapid context switching, or by actually concurrently) running a first runtime library associated with a first service version of the distributed computerized service and a second runtime library associated with a different service version of the distributed computerized service. While running the first runtime library, job requests of a first service version may be at least partially processed using a first set of one or more executables that interact with the first runtime library. While running the second runtime library, job requests of a second service version may be at least partially processed using a second set of one or more executables that interact with the second runtime library.

19 Claims, 4 Drawing Sheets

(51) Int. Cl.
*G06F 9/445* (2018.01)
*G06F 9/50* (2006.01)

(52) U.S. Cl.
CPC .......... *H04L 67/02* (2013.01); *H04L 67/1097* (2013.01); *H04L 67/16* (2013.01)

(56) References Cited

U.S. PATENT DOCUMENTS

| | | | |
|---|---|---|---|
| 7,140,012 B2* | 11/2006 | Pugh | G06F 8/71 717/170 |
| 7,178,143 B2* | 2/2007 | Pugh | G06F 8/71 707/999.202 |
| 7,647,636 B2* | 1/2010 | Polyakov | G06F 21/566 713/187 |
| 7,698,419 B2 | 4/2010 | Flores et al. | |
| 8,387,032 B1* | 2/2013 | Goldman | G06F 8/54 717/110 |
| 8,903,711 B2 | 12/2014 | Lundberg et al. | |
| 9,122,535 B2 | 9/2015 | Soundararajan et al. | |
| 9,183,058 B2 | 11/2015 | Li et al. | |
| 9,207,956 B2 | 12/2015 | Schuler | |
| 9,262,217 B1 | 2/2016 | Xiang et al. | |
| 9,477,502 B2 | 10/2016 | Chambers et al. | |
| 9,773,014 B2 | 9/2017 | Lee et al. | |
| 9,891,939 B2* | 2/2018 | Hunt | G06F 9/45558 |
| 2002/0133805 A1* | 9/2002 | Pugh | G06F 8/71 717/120 |
| 2010/0115504 A1* | 5/2010 | Cai | H04L 29/12047 717/170 |
| 2012/0159506 A1 | 6/2012 | Barham et al. | |
| 2012/0191714 A1 | 7/2012 | Datar et al. | |
| 2012/0227039 A1 | 9/2012 | Ferdman et al. | |
| 2013/0227558 A1 | 8/2013 | Du et al. | |
| 2014/0059310 A1 | 2/2014 | Du et al. | |
| 2014/0059552 A1 | 2/2014 | Cunningham et al. | |
| 2015/0058843 A1 | 2/2015 | Holler et al. | |
| 2015/0121371 A1 | 4/2015 | Gummaraju et al. | |
| 2015/0339210 A1 | 11/2015 | Kopp et al. | |
| 2016/0179581 A1 | 6/2016 | Soundararajan et al. | |
| 2017/0046420 A1 | 2/2017 | Fuchs | |

OTHER PUBLICATIONS

White, Tom, "Hadoop: The Definitive Guide 4th Edition", In Publication of O'Reilly Media, Apr. 2015, 756 pages.

Livshits, et al., "CONSCRIPT: Specifying and Enforcing Fine-Grained Security Policies for JavaScript in the Browser", In Microsoft Research Technical Report of MSR-TR-2009-158, Dec. 3, 2009, pp. 1-24.

"Apache Slider: Dynamic YARN Application", Published on: Nov. 30, 2014 Available at: https://slider.incubator.apache.org/.

"Hadoop MapReduce Next Generation—Distributed Cache Deploy", Published on: Feb. 24, 2015 Available at: https://hadoop.apache.org/docs/r2.5.2/hadoop-mapreduce-client/hadoop-mapreduce-client-core/ DistributedCacheDeploy.html.

Kakade, et al., "Spam Filtering Techniques and MapReduce with SVM: A Study", In Proceedings of Asia-Pacific Conference on Computer Aided System Engineering, Feb. 12, 2014, pp. 59-64.

Ulusoy, et al., "Honeypot Based Unauthorized Data Access Detection in MapReduce Systems", In Proceedings of IEEE International Conference on Intelligence and Security Informatics, May 27, 2015, pp. 126-131.

Musa, et al., "A Converged Service Plane for Virtual Infrastructure Containers", In International Journal of Computer Science Issues, vol. 10, Issue 2 No. 2, Mar. 2013, pp. 375-386.

Xu, et al., "Deploying and Researching Hadoop in Virtual Machines", In Proceeding of the IEEE International Conference on Automation and Logistics, Aug. 2012, pp. 395-399.

"Non Final Office Action Issued in U.S. Appl. No. 15/197,583", dated Nov. 2, 2018, 19 Pages.

* cited by examiner

PROCESSING REQUESTS FOR MULTI-VERSIONED SERVICE

CROSS-REFERENCE TO RELATED APPLICATIONS

This application claims the benefit of U.S. Provisional Patent Application Ser. No. 62/233,992, filed Sep. 28, 2015, which provisional patent application is incorporated herein by reference in its entirety.

BACKGROUND

Computing systems and associated networks have revolutionized the way human beings work, play, and communicate. Nearly every aspect of our lives is affected in some way by computing systems. Computing systems are particularly adept at processing data. When processing large amounts of data (often referred to simply as "big data") that itself might be distributed across multiple network nodes, it is often most efficient to divide data processing amongst the various network nodes. These divisions of logical work are often referred to as "vertices" in the plural, or a "vertex" in the singular. Not only does this allow for efficiencies of parallelizing, but it also allows for the data that is being processed to be closer to the processing node that is to process that portion of the data.

One common programming model for performing such parallelization is often referred to as the map-reduce programming model. In the mapping phase, data is divided by key (e.g., along a particular dimension of the data). In the reduce phase, the overall task is then divided into smaller portions that can be performed by each network node, such that the intermediate results obtained thereby can then be combined into the final result of the overall job. Many big data analytical solutions build upon the concept of map reduce.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a computerized mechanism for processing received job requests for a multi-versioned distributed computerized service. For instance, the distributed computerized service might be a map-reduced based service. However, each version of the distributed computerized service has an associated runtime library that are made available to components that offer the service. An example of the distributed computerized service is a queriable data store, such as a big data store.

For instance, a processing node of a cloud computing environment might have one or more executables that perform job compilation for one version of the distributed computerized service by compiling job requests into execution plans. Another processing node of the cloud computing environment might have one or more other executables that perform job scheduling for the associated version of the distributed computerized service by using the execution plan to schedule vertices of the job. Other processing nodes of the cloud computing environment might have yet one or more other executable that are workers that actually execute the scheduled vertices as directed by the scheduler. No matter what role the processing node plays (compiler, scheduler, or worker), the processing node utilizes a runtime library that corresponds to the version of the distributed computerized service. A computing system that performs a role in a distributed computerized service will be referred to as a "processing node" or "service processing node" herein.

This configuration allows for job requests to be appropriately dispatched to a proper version of a distributed computerized service. In some embodiments, each of the service processing nodes may quickly access the runtime library for each version of the distributed computerized service via a centralized store in which the runtime libraries are already represented in allocated form. For instance, the runtime library binary may simply be loaded from the centralized store into the memory of the service processing node to allow the service processing node to serve a particular version of the distributed computerized service. Thus, a service processing node may quickly change from one version of the distributed computerized service to another. Such switching may be performed so quickly that the service processing node may even be seen as running multiple versions of the distributed computerized service simultaneously, especially when viewed in the context of a long running service.

Accordingly, the service processing node may perform a method for at least partially processing a job request (e.g., as a compiler, scheduler, or worker) for multiple versions of a distributed computing service. The service processing node does this by at least interleavingly (e.g., via time sharing with rapid context switching, or by actually concurrently) running a first runtime library associated with a first service version of the distributed computerized service and a second runtime library associated with a different second service version of the distributed computerized service. While running the first runtime library, job requests of a first service version may be at least partially processed using a first set of one or more executables that interact with the first runtime library. While running the second runtime library, job requests of a second service version may be at least partially processed using a second set of one or more executables that interact with the second runtime library. This principle may be extended to running three or more versions of a runtime library also to support three or more versions of a distributed computerized service.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
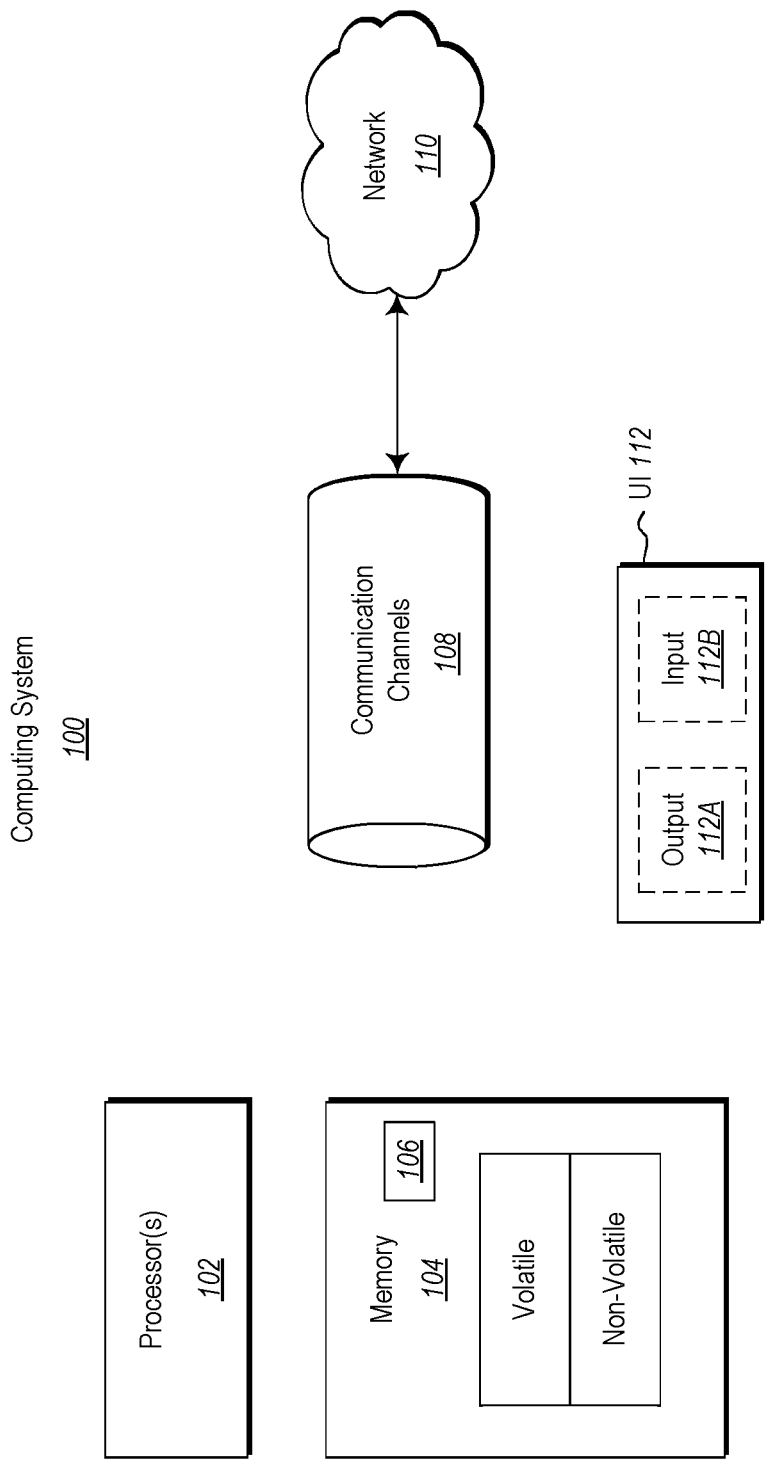
FIG. 1 illustrates an example computing system in which the principles described herein may be employed.

At least some embodiments described herein relate to a computerized mechanism for processing received job requests for a multi-versioned distributed computerized service. For instance, the distributed computerized service might be a map-reduced based service. However, each version of the distributed computerized service has an associated runtime library that are made available to components that offer the service. An example of the distributed computerized service is a queriable data store, such as a big data store.

For instance, a processing node of a cloud computing environment might have one or more executables that perform job compilation for one version of the distributed computerized service by compiling job requests into execution plans. Another processing node of the cloud computing environment might have other one or more executables that perform job scheduling for the associated version of the distributed computerized service by using the execution plan to schedule vertices of the job. Other processing nodes of the cloud computing environment might have yet one or more other executable that are workers that actually execute the scheduled vertices as directed by the scheduler. No matter what role the processing node plays (compiler, scheduler, or worker), the processing node utilizes a runtime library that corresponds to the version of the distributed computerized service. A computing system that performs a role in a distributed computerized service will be referred to as a "processing node" or "service processing node" herein.

This configuration allows for job requests to be appropriately dispatched to a proper version of a distributed computerized service. In some embodiments, each of the service processing nodes may quickly access the runtime library for each version of the distributed computerized service via a centralized store in which the runtime libraries are already represented in allocated form. For instance, the runtime library binary may simply be loaded from the centralized store into the memory of the service processing node to allow the service processing node to serve a particular version of the distributed computerized service. Thus, a service processing node may quickly change from one version of the distributed computerized service to another. Such switching may be performed so quickly that the service processing node may even be seen as running multiple versions of the distributed computerized service simultaneously, especially when viewed in the context of a long running service.

Accordingly, the service processing node may perform a method for at least partially processing a job request (e.g., as a compiler, scheduler, or worker) for multiple versions of a distributed computing service. The service processing node does this by at least interleavingly (e.g., via time sharing with rapid context switching, or by actually concurrently) running a first runtime library associated with a first service version of the distributed computerized service and a second runtime library associated with a different second service version of the distributed computerized service. While running the first runtime library, job requests of a first service version may be at least partially processed using a first set of one or more executables that interact with the first runtime library. While running the second runtime library, job requests of a second service version may be at least partially processed using a second set of one or more executables that interact with the second runtime library. This principle may be extended to running three or more versions of a runtime library also to support three or more versions of a distributed computerized service.

Some introductory discussion of a computing system will be described with respect to FIG. 1. Then, the mechanism and methods that enable the partial processing of job requests associated with different versions of a distributed computerized service will be described with respect to FIGS. 2 through 4.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine", "scheduler", "manager", "module", "compiler", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, projectors, tactile output, valves, actuators, holograms, virtual reality objects, and so forth. Examples of input mechanisms 112B might include, for instance, microphones, touchscreens, holograms, cameras, keyboards, accelerometers, levers, pedals, buttons, knobs, mouse of other pointer input, sensors of any type, virtual reality objects, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
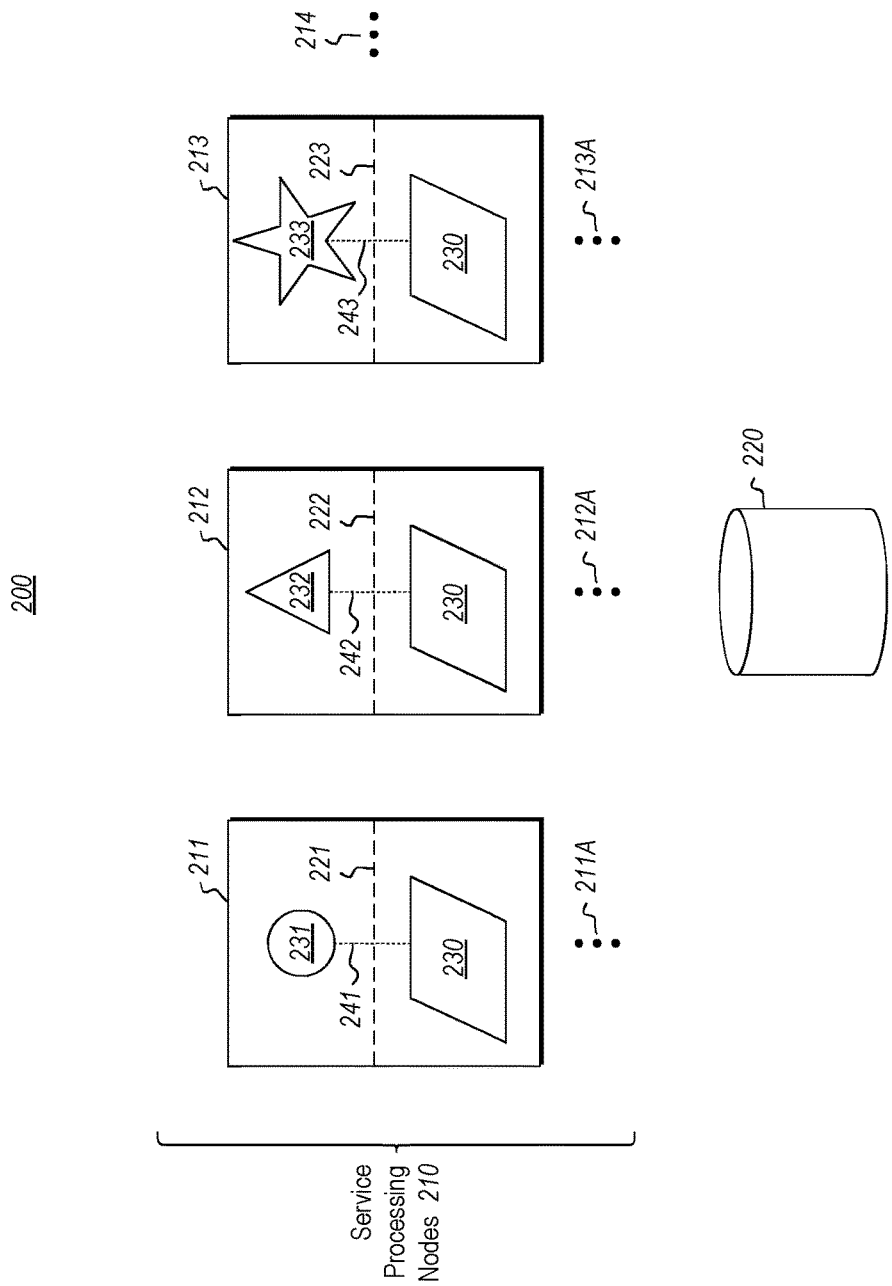
FIG. 2 symbolically illustrates a service environment of a distributed computerized service having a single version each which each of multiple service processing nodes plays a role in the overall distributed computerized service.

FIG. 2 symbolically illustrates a service environment 200 of a distributed computerized service having a single version. The service environment 200 includes multiple service processing nodes 210 including a first service processing node 211 that plays a role (hereinafter also referred to as a "first role") in the distributed computerized service, a second service processing node 212 that plays another role (hereinafter also referred to as a "second role") in the distributed computerized service, and a third service processing node 213 that plays yet another role (hereinafter also referred to as a "third role") in the distributed computerized service.

The ellipses 214 represent that there may be yet other groups of service processing nodes that perform one or more further roles in the distributed computerized service. The ellipses 211A, 212A and 213A represent that there may be more than one service processing node that plays the part of the first role, second role, and third role, respectively, in the distributed computerized service. In one embodiment, the distributed computerized service involves the processing of a job request. In that case, each of the roles played may be viewed as at least partially processing the job request. An example of a distributed computerized service is a web service, or any offering that involves computerized processing that is available over a network. For instance, a distributed computerized service might include a big data query service, or a database query service.

Each service processing node 210 may be, for instance, a computing system in a dedicated environment of interconnected computing systems, in which the environment serves as a pool of resources to respond to incoming job requests. As an example, if the dedicated environment were a cloud computing environment (such as a public, private, or hybrid cloud), each of the service processing nodes might be a processing node in that cloud computing environment. In any case, the service processing nodes 210 may each be structured as described above for the computing system 100 of FIG. 1. Furthermore, the service processing nodes 210 may each have access to a centralized store 220.

Each of the service processing nodes associated with a given version of the distributed computerized service has a common runtime library. In FIG. 2, this runtime library is represented by the shape below the respective dashed line 221, 222 and 223. For instance, each of the service processing nodes 211, 212 and 213 has a common runtime library 230. The commonality of the runtime library for all service processing nodes that contribute to the distributed computerized service of the given version is represented by the common runtime library 230 having a same shape (e.g., a rightward leaning parallelogram) in each of the service processing nodes 211, 212 and 213 as illustrated just below the respective dashed lines 221, 222 and 223.

Notwithstanding that each of the service processing nodes 210 performs part of the same version of the distributed computerized service, each of the service processing nodes 211, 212 and 213 performs a different role within the distributed computerized service. The role that the service processing nodes 210 performs is defined by the identity of the set of one or more executables that interact with the runtime library of the version of the distributed processing node. The role that a set of executables plays within the distributed computerized service is represented by the shape above the dashed lines 221, 222 and 223 in each of the service processing nodes 211, 212 and 213. An executable may be any set of one or more instruction that may be directly or indirectly executed to affect the functioning of the service processing node. Examples include functions, routines, objects, procedures, methods, directives, and the like.

For instance, the service processing node 211 is illustrated has have a set 231 of one or more executables that cause the service processing node 211 of one type (as represented by a circle) that interact (as represented by dotted line 241) with the runtime library 230 in a manner to provide a first role within the distributed computerized service. The service processing node 212 is illustrated as having another set 232 of one or more executables of a second type (as represented by a triangle) that interact (as represented by dotted line 242) with the runtime library 230 in a manner to provide a second role within the distributed computerized service. Likewise, the service processing node 213 is illustrated as having another set 233 of one or more executables of a third type (as represented by a five-pointed star) that interact (as represented by dotted line 243) with the runtime library 230 in a manner to provide a third role within the distributed computerized service.

As an example, the first role might be a compilation role that is configured to compile job requests that are to be processed into a corresponding execution plan for the distributed computerized service. Thus, the service processing node 211 might receive a job request and provide a corresponding execution plan. As another example, the second role might be a scheduling role that is configured to schedule one or more vertices of an execution plan one or more other service processing nodes. A stage of an execution plan may comprise one vertex (e.g., code) of the compiled job, or may be a parallel combination of vertices of the compiled job. For instance, if the execution plan is a map-reduce plan, then the parallel vertices of a stage might be divided by key in accordance with a map-reduce framework. Thus, the service processing node 212 might receive an execution plan and dispatch vertices according to a schedule onto one or more worker processing nodes. As another example, the third role might a worker role that executes a vertex of an execution plan. Thus, the service processing node 213 might receive a vertex execution assignment from the scheduler (e.g., service processing node 212), execute the vertex accordingly, and report back to the scheduler upon completion.

Figure 3:
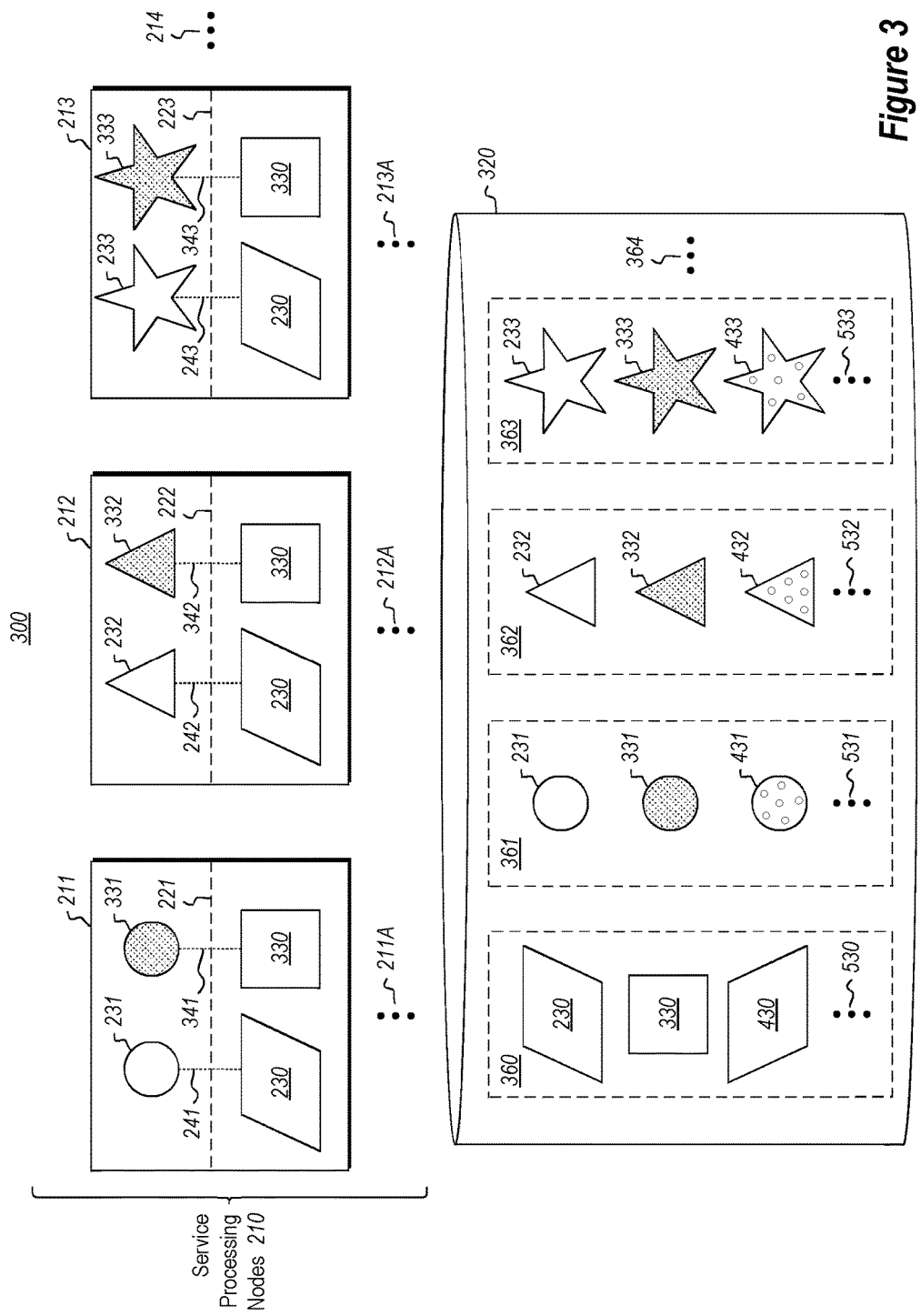
FIG. 3 is an environment that is similar to that of FIG. 2, except that each service processing node now plays roles in multiple versions of the distributed computerized service.

FIG. 3 illustrates a service environment 300 that is like the service environment 200 of FIG. 2, except that each of the service processing nodes 210 runs a second runtime library 330, in addition to the first runtime library 230. The service processing nodes 210 again have access to a centralized store 320. The centralized store 320 includes multiple runtime libraries 350, each corresponding to a different version of the distributed computerized service. For instance, a different version might be a test version of a more commonly used version, or perhaps a new upgraded version of an older version.

For instance, the runtime libraries 350 are illustrated as including the runtime library 230 that supports to the first version of the distributed computerized service. The runtime libraries 350 also includes a second runtime library 330 that is used to implement a second version of the distributed computerized service. That is, all service processing nodes that contribute to roles within the second version of the distributed computerized service have the second runtime library 330. The common functionality provided by the second runtime library 330 for the second version of the distributed computerized service is represented by each of the runtime library 330 having a same shape—a rectangle. The runtime library 350 also has a third runtime library 430 that is used to implement a third version of the distributed computerized service. That is, all service processing nodes that contribute to roles within the third version of the distributed computerized service have the third runtime library 430. The common functionality provided by the third runtime library 430 for the third version of the distributed computerized service is represented by each of the runtime library 430 having a same shape—a left leaning parallelogram.

The ellipses 530 represent that the runtime libraries 350 may include runtime libraries for any number of versions of the distributed computerized service. In some embodiments, the runtime libraries are already in allocated form, such that the binary of the runtime library need only be loaded into the system memory of a service processing node in order for the service processing node to be ready to play a role the distributed computerized service.

In the service environment 300 as depicted, each of the service processing nodes 210 serves the same role for each of the two versions of the distributed computerized service. For instance, the service processing node 211 may have a set of executable(s) 331 that interact (as represented by the dotted line 341) with the second runtime library 330 in order to provide the first role of the second version of the distributed computerized service. Recall from the description of FIG. 2, and as also noted in FIG. 3, that the service processing node 211 may have a set of executable 231 that interact (as represented by the dotted line 241) with the first runtime library 230 in order to provide the same first role of the first version of the distributed computerized service.

The executable(s) 231 for the first role of the first service version may, however, be different than the executable(s) 331 for the first role of the second service version. The similarity of the roles is represented by the executable(s) 231 and 331 being represented by the same shape. The difference in the executable(s) 231 and 331 (to account for the need to interact with different runtime libraries, and provide somewhat different functionality within the same role) is represented by the executable(s) 331 being filled with dots, whereas the executable(s) 231 are represented as not being filled.

Also, in the service environment 300, the service processing node 212 serves the same role for each of the two versions of the distributed computerized service. For instance, the service processing node 212 may have a set of executable(s) 332 that interact (as represented by the dotted line 342) with the second runtime library 330 in order to provide the second role of the second version of the distributed computerized service. Service processing node 212 is also illustrated in FIG. 3 as having a set of executable(s) 232 that interact (as represented by the dotted line 242) with the first runtime library 230 in order to provide the same second role of the first version of the distributed computerized service.

Also, in the service environment 300, the service processing node 213 serves the same role for each of the two versions of the distributed computerized service. For instance, the service processing node 213 may have a set of executable(s) 333 that interact (as represented by the dotted line 343) with the second runtime library 330 in order to provide the third role of the second version of the distributed computerized service. Service processing node 213 is also illustrated in FIG. 3 as having a set of executable(s) 233 that interact (as represented by the dotted line 243) with the first runtime library 230 in order to provide the same third role of the first version of the distributed computerized service.

Thus, for instance, the service processing node 211 may provide a compilation role for multiple versions of the distributed computerized service (each version having a different runtime library). Likewise, the service processing node 212 may provide a scheduling role for multiple versions of the distributed computerized service. Furthermore, the service processing nodes 213 may provide a worker role for multiple versions of the distributed computerized service.

The centralized store 320 also includes a first role executable set collection 361 that includes the executable(s) 231 that interact (as represented by dotted line 241 in FIGS. 2 and 3) with the first runtime library 230 to allow a service processing node to perform a first role for a first version of the distributed computerized service, the executable(s) 331 that interact (as represented by dotted line 341 in FIG. 3) with the second runtime library 330 to allow a service processing node to perform a first role for a second version of the distributed computerized service, and executable(s) 431 that interacts with the third runtime library 430 to allow a service processing node to perform a first role for a third version of the distributed computerized service. The same shape of the executable(s) sets 231, 331, and 431 again emphasis that they are to allow a service processing node to providing the same role, albeit with different versions of the distributed computerized service.

The different fill (no fill for executable(s) 231, dotted fill for executable(s) 331, and small circle fill for executable(s) 431) represent differences in functionality that enable the executable(s) to interact with the respective runtime for the corresponding service version, and to account for other potential functional differences that still fall within the scope of the same role. The ellipses 531 represent that there may be other executable(s) sets, each for providing the first role with respect to other versions of the distributed computerized service.

The centralized store 320 also includes a second role executable set collection 362 that includes the executable(s) 232 that interact (as represented by dotted line 242 in FIGS. 2 and 3) with the first runtime library 230 to allow a service processing node to perform a second role for a first version of the distributed computerized service, the executable(s) 332 that interact (as represented by dotted line 342 in FIG. 3) with the second runtime library 330 to allow a service processing node to perform a second role for a second version of the distributed computerized service, and executable(s) 432 that interacts with the third runtime library 430 to allow a service processing node to perform a second role for a third version of the distributed computerized service. Similarity of shape, and differences of fill, have the same symbolic representation with respect to the executable set collection 362 for the second role as described above for the executable set collection 361 for the first role. The ellipses 532 represent that there may be other executable(s) sets, each for providing the second role with respect to other versions of the distributed computerized service.

The centralized store 320 also includes a third role executable set collection 363 that includes executable(s) 233 that interact with the first runtime library 230 to allow a service processing node to perform a third role for a first version of the distributed computerized service, executable(s) 333 that interact with the second runtime library 330 to allow a service processing node to perform a third role for a second version of the distributed computerized service, and executable(s) 433 that interacts with the third runtime library 430 to allow a service processing node to perform a third role for a third version of the distributed computerized service. Similarity of shape, and differences of fill, have the same symbolic representation with respect to the executable set collection 363 for the second role as described above for the executable set collection 361 for the first role. The ellipses 533 represent that there may be other executable(s) sets, each for providing the third role with respect to other versions of the distributed computerized service.

The ellipses 364 represent that there may be other executable set collections, each including executable(s) sets for a particular role for each of the versions of the distributed computerized service. In some embodiments, the executable(s) of each of the executable set collections 361, 362, 363 and 364 within the centralized store 330 may already in allocated form, such that the binary of the executable(s) need only be loaded into the system memory of a service processing node in order for the service processing node to be ready to play a role the distributed computerized service upon interacting with the appropriate runtime.

The service environment 300 is illustrated as having a limited number of service processing nodes. However, the principles described herein contemplate any number of available service processing nodes from as few as several, to as many as potentially millions or billions, such as in a typical public cloud computing environment. The service environment 300 further shows that each service processing node 210 may play a role in multiple versions of the distributed computerized service. However, the number of types of runtime libraries (each associated with a different version) that are run by any give service processing node may be anywhere from zero to many, and may fluctuate over time with demand for different versions of the distributed computerized service.

Furthermore, although the service environment 300 shows each service processing node involved in version(s) of the distributed computerized service playing a same role, the principles described herein also operate in which a service processing node plays different roles with respect to different versions of the distributed computerized service. As an example, a service processing node may be a compiler for a first version of a distributed computerized service, a scheduler for a second version of the distributed computerized service, and a worker for a third version of the distributed computerized service.

Figure 4:
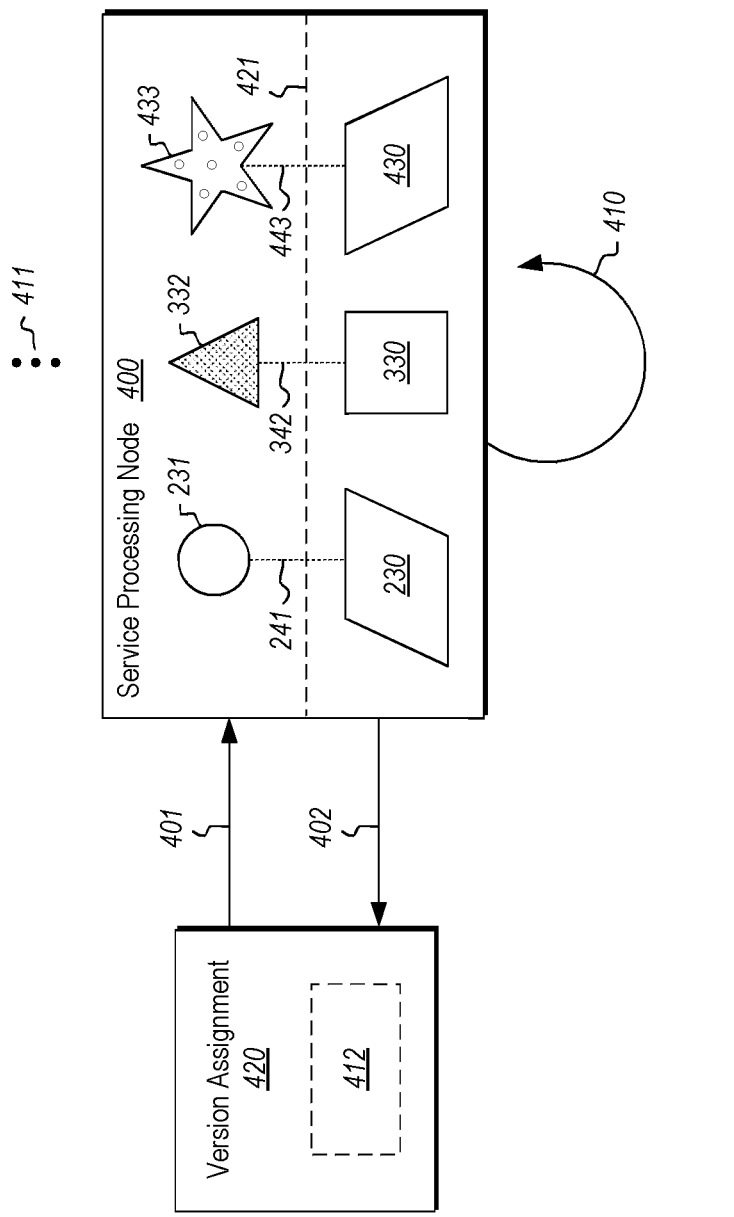
FIG. 4 is an example service processing node that interacts with a version assignment component, and with a durable local or centralized store, in order to perform proper roles in proper versions of a distributed computerized service, where the role plays by the service processing node for each of the service versions need not be the same.

For instance, FIG. 4 illustrates a service processing node 400 that includes three runtime libraries 230, 330 and 430. Executable(s) 231 interact (as represented by dotted line 241) with the first runtime library 230 (represented by a right leaning parallelogram) to provide a first role for a first version of the distributed computerized service. Executable(s) 332 interact (as represented by dotted line 342) with the second runtime library 330 (as represented by a rectangle) to provide a second role for a second version of the distributed computerized service. Executable(s) 433 interact (as represented by dotted line 443) with the third runtime library 430 (as represented by a left leaning parallelogram) to provide a third role for a third version of the distributed computerized service.

In FIG. 4, the service processing node 400 may load (as represented by arrow 410) an already allocated form of an appropriate runtime library for a version of the distributed computerized service either from a local durable store or from a centralized store (such as the centralized store 230 of FIG. 2 or the centralized store 330 of FIG. 3). For instance, this might be performed in response to an instruction (as represented by arrow 401) to process a job request of a version of the distributed computerized service for which the service processing node 400 does not yet have an associated runtime library up and running. The runtime library may be implemented and encapsulated as one binary package. Once a version of engine package is finalized to deploy, it is upload to a centralized store (e.g., a cloud store) which can be accessed by other service processing nodes and components (e.g., within a cluster). By having a versioned package, compatibility between different components in one version in guaranteed.

The service processing node 400 may also load (as represented by arrow 410) an already allocated form of appropriate already allocated executable(s) that allow the service processing node to perform a new role with respect to a version of the distributed computing system for which the service processing node already has or is also loading. Such loading might also be performed in response to an instruction 401 to for the service processing node to perform that role. The service processing node may also respond (as represented by the arrow 402) to that request.

In one embodiment, the loading operation (represented by arrow 410) may be implemented by a service host that is a service deployed to all service processing nodes within a defined boundary (e.g., within a cluster). It is designed to loads and unloads versions of the distributed computerized service based on the commands from the version assignment component, and also monitors the status of services in the service processing node.

A version assignment component 420 may perform the request 401, and register the responses 402 for each of multiple service processing components (as represented by the ellipses 411). A registry 412 may include an identifying of each service processing node, an indication of which service processing node is capable of running which service versions, and for each service version, what role the service processing node can plan. In some embodiments, the registry 412, or portions thereof, may be remotely located from the version assignment component 420. For instance, the registry 420 might include representations of numerous service processing nodes that are capable of compiling job requests for each of multiple versions of a distributed computerized service.

In FIGS. 3 and 4, service processing nodes are illustrated as running multiple runtime libraries using a single set of hardware resources (e.g., a single service processing node). This may be accomplished by at least interleavingly running multiple runtime libraries. In this description and in the claims, "at least interleavingly running" multiple runtime libraries means that the runtime libraries are either interleavingly run or concurrently run. In the case of concurrency, the service processing node may be capable of running concurrent threads at least one for each runtime library.

In this description and in the claims, "interleavingly" running of multiple runtime libraries means that no more than one of the first runtime library and the second runtime library is available in a system memory of the service processing node at a time. When a runtime library is not available in the system memory for a given service version, that runtime library is obtained (e.g., in already allocated form) from local durable storage, or from a centralized store. When an executable(s) to play a certain role is not available in the system memory for a given role, and the service processing node is about to commence that role, the appropriate executable(s) are obtained (e.g., in already allocated form) from local durable storage, or from a centralized store. In the context of long-running services, this change in context during to interleaving is often fast enough that the service processing node may still be seen as simultaneously running two runtimes, especially when the switching is hastened by the runtime library and/or executable(s) already being in the appropriate binary form, and ready to execute.

Accordingly, the principles described herein allow a service version to flexibly operate multiple versions of a distributed computing service simultaneously. This allows for considerable opportunity to employ multiple service versions using a common set of available service processing nodes. For instance, older and newer service versions may exist concurrently. This allows for job requests to continue processing as they always have, using an older version (thereby providing legacy support), while also accommodating new adopters (for those willing to try newer versions), and all job requests in-between. Furthermore, new versions can be tested with a small amount of traffic to verify proper operation before more wide scale usage of that version.

Interactive, reliable, and rich data analytics at cloud scale is a key capability to support low latency data exploration and experimentation over terabytes of data for a wide range of business scenarios. Comparing with existing systems, the principles descried herein improve all the services in the pipeline as pre-allocated and long-running services including compilation/query optimization service, scheduling service and worker services. This approach reduces overhead of resource allocation and application initialization which contributes a big portion of latency in our interactive analytics so that the query performance improves. By re-using the service, the system overhead is reduced and the overall efficiency and utilization improved.

In modern distributed computation system (typically Map/Reduce framework), one user query is executed in the following steps. First, it is compiled and optimized as an execution graph in which a lot of independent workers are included. Second, the workers are scheduled by a scheduler to the distributed cluster and third, each worker was executed till the execution finishes. As mentioned, multiple steps and services are involved in one query execution. The end-to-end latency and overheads in both the query lifetime and system level are non-trivial. Especially when an interactive/realtime scenario (comparing with batch scenario) is considered, the challenges are significant.

In accordance with the principles described herein, a new version of a service may be deployed in any of the following scenarios: 1. a new version of engine is developed to replace the old one; 2. a new version of engine is developed but need some validation in cluster environment; 3. a new version of engine is required to some particular users/user groups who should be served isolated; and 4) so forth.

Once a new version of service is deployed as a binary package, a coordinator will find and record it. If a configuration change is triggered to start serving that version, the coordinator will start to work with each service host to start the new version of service. Once all the service hosts are done for the new version deployment, the new version of service is hosted for requests.

Accordingly, a service based map-reduce execution engine is described. The engine is an interactive/real-time engine with reduced query execution latency and improved system efficiency. Furthermore, a service version package concept is described. The full End-to-End service (including compiler, query optimizer, scheduler and workers) are enclosed as one binary package within a unique version. This also provides isolations between users/user groups;

In addition, a binary based service deployment is described. Because the service is all in one binary package, it becomes so easy to deploy by just uploading the binary package to the distributed store layer.

Furthermore, a coordinator/service host based framework has been described with multiple versions running in parallel. The coordinator will manage all the versioned packages and decides which versions (can be more than one) will run and to serve which user/user group.

Finally, a white list based runtime avoids worker services being polluted by user code. A portion of user code may be supported in user request for convenience. However, to avoid arbitrary user code/logic from polluting the long running service, a white list check is in place to verify the C# user code in syntax level so that only trusted C# code can be executed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A service processing node for at least partially processing job requests for a distributed computerized service having a plurality of service versions, the service processing node comprising:

one or more processors;
one or more computer-readable storage devices having thereon computer-executable instructions that, when executed by the one or more processors of the service processing node, cause the service processing node to perform a method comprising:
  interleavingly running, the interleavingly running including both time sharing and context switching, a first runtime library associated with a first service version of the distributed computerized service and a second runtime library associated with a different second service version of the distributed computerized service;
  while running the first runtime library, least partially processing a first job request of a first service version using a first set of one or more executables that interact with the first runtime library; and
  while running the second runtime library, at least partially processing a second job request of a second service version using a second set of one or more executables that interact with the second runtime library,
  wherein the act of at least interleavingly running the first runtime library associated with the first service version and the second runtime version associated with the second service version comprising the following:
    an act of interleavingly running the first runtime library and the second runtime library such that no more than one of the first runtime library and the second runtime library is available in a system memory of the service processing node at a time.

2. The service processing node in accordance with claim 1, the act of at least interleavingly running the first runtime library associated with the first service version and the second runtime version associated with the second service version comprising the following:
  an act of concurrently running the first runtime library and the second runtime library.

3. The service processing node in accordance with claim 1, wherein when the first runtime library is not available in the system memory of the service processing node during the act of interleavingly running, the first runtime library is available in already allocated form in a durable storage.

4. The service processing node in accordance with claim 1, wherein when the second runtime library is not available in the system memory of the service processing node during the act of interleavingly running, the second runtime library is available in already allocated form in a durable storage.

5. The service processing node in accordance with claim 3, wherein when the first runtime library is about to run the first runtime library, the first runtime library is acquired from the durable storage.

6. The service processing node in accordance with claim 3, wherein when the first set of one or more executables is about to run the first runtime library, the first set of one or more executables is acquired from the durable storage.

7. The service processing node in accordance with claim 1, the method further comprising the following prior to the act of at least interleavingly running:
  an act of running the first runtime library on the service processing node;
  during the act of running the first runtime library on the service processing node, an act of determining that the second runtime library is to be run on the service processing node;
  an act of the service processing node acquiring the second runtime library in already allocated form from a centralized storage that is available to a plurality of service processing nodes; and
  an act of acquired second runtime library to initiate the act of at least interleavingly running.

8. The service processing node in accordance with claim 1, the act of determining that the second runtime library is to be run on the service processing node comprising:
  an act of receiving an instruction to begin the second runtime library from a version coordination service.

9. The service processing node in accordance with claim 1, the second runtime library being an upgraded version of the first runtime library.

10. The service processing node in accordance with claim 1, the first set of one or more executables comprising a compiler for compiling the first job request of the first service version into an execution plan of the first service version.

11. The service processing node in accordance with claim 10, the second set of one or more executables also comprising a compiler for compiling the second job of the second service version into an execution plan of the second service version.

12. The service processing node in accordance with claim 10, the first set of one or more executables allowing the service processing node to perform a first role with respect to the first service version, the second set of one or more executable allowing the service processing node to perform a second role with respect to the second service version.

13. The service processing node in accordance with claim 12, the first and second roles being a same role.

14. The service processing node in accordance with claim 12, the first and second roles being different roles.

15. The service processing node in accordance with claim 12, the first role selected from a group consisting of:
  a compiler role for compiling job requests of the corresponding service version into an execution plan of the corresponding service version;
  a scheduler role for scheduling vertices of execution plans of a corresponding service version; and
  a worker role for performing vertices of execution plans of a corresponding service version.

16. The service processing node in accordance with claim 1, the act of at least interleavingly running a first runtime library associated with a first service version of the distributed computerized service and a second runtime library associated with a different second service version of the distributed computerized service, comprising:
  an act of at least interleavingly running the first runtime library, the second runtime library, and also a third runtime library associated with a third service version of the distributed computerized service.

17. The service processing node in accordance with claim 16, the method further comprising:
  while in the act of running the third runtime library, an act of at least partially processing a third job request of a third service version using a third set of one or more executables that interact with the third runtime library.

18. A computer-implemented method performed on a service processing node, the method comprising:
  interleavingly running, the interleavingly running including both time sharing and context switching, a first runtime library associated with a first service version of a distributed computerized service and a second runtime library associated with a different second service version of the distributed computerized service;

while running the first runtime library, at least partially processing a first job request of a first service version using a first set of one or more executables that interact with the first runtime library; and while running the second runtime library, at least partially processing a second job request of a second service version using a second set of one or more executables that interact with the second runtime library, wherein the act of at least interleavingly running the first runtime library associated with the first service version and the second runtime version associated with the second service version comprising the following:

an act of interleavingly running the first runtime library and the second runtime library such that no more than one of the first runtime library and the second runtime library is available in a system memory of the service processing node at a time.

19. A computer program product comprising one or more computer-readable storage hardware devices having thereon computer-executable instructions that are structured such that, when executed by one or more processors of a service processing node, cause the service processing node to perform a method comprising:

interleavingly running, the interleavingly running including both time sharing and context switching, a first runtime library associated with a first service version of a distributed computerized service and a second runtime library associated with a different second service version of the distributed computerized service;

while running the first runtime library, at least partially processing a first job request of a first service version using a first set of one or more executables that interact with the first runtime library; and while running the second runtime library, at least partially processing a second job request of a second service version using a second set of one or more executables that interact with the second runtime library, wherein the act of at least interleavingly running the first runtime library associated with the first service version and the second runtime version associated with the second service version comprising the following:

an act of interleavinely running the first runtime library and the second runtime library such that no more than one of the first runtime library and the second runtime library is available in a system memory of the service processing node at a time.

* * * * *